United States Patent [19]
Spitzberg

[11] 3,981,589
[45] Sept. 21, 1976

[54] AUTOMATIC OBJECTIVE LENSOMETER

[75] Inventor: Larry Spitzberg, San Rafael, Calif.

[73] Assignee: Optical Sciences Group, San Rafael, Calif.

[22] Filed: Oct. 30, 1974

[21] Appl. No.: 519,092

[52] U.S. Cl. .............................. 356/127; 356/125
[51] Int. Cl.² ............................................ G01B 9/00
[58] Field of Search ................. 356/124, 125, 127

[56] References Cited
UNITED STATES PATENTS

| | | | |
|---|---|---|---|
| 1,873,526 | 8/1932 | Allen | 356/127 |
| 3,473,067 | 10/1969 | Rittmayer | 250/552 |
| 3,832,066 | 8/1974 | Cornsweet | 356/127 |

FOREIGN PATENTS OR APPLICATIONS

| | | | |
|---|---|---|---|
| 591,991 | 9/1947 | United Kingdom | 356/124 |

*Primary Examiner*—John K. Corbin
*Assistant Examiner*—Richard A. Rosenberger
*Attorney, Agent, or Firm*—Harris Zimmerman

[57] ABSTRACT

A device for automatically measuring the spherical power, cylindrical axis and power and prism of an ophthalmic lense, with each determined independently of each other without a servo system. At least two LEDs act as point-sources of light, as Scheiner apertures. The light from the LEDs pass through an objective lens, thence through a selectively translatable aperture target, and then pass through a collimating lense. The LED rays then pass through the lens under study, and the target images are focused by a telescope objective lens onto a light sensitive detector. The detector which is selectively rotatable in concert with the LEDs is partitioned into Cartesian quadrants. Rotation of the detector and LEDs until the target images fall on the major detector axis discloses the axis of the cylinder of the lens being measured independent of lens power. Translation of the target until the target images maximally coincide reveals the power of the lens in its principal meridian. The LEDs are driven by a square wave, and a unique electronic circuit reads the quadrant sensitive detector to detect major axis and maximum coincidence.

11 Claims, 11 Drawing Figures

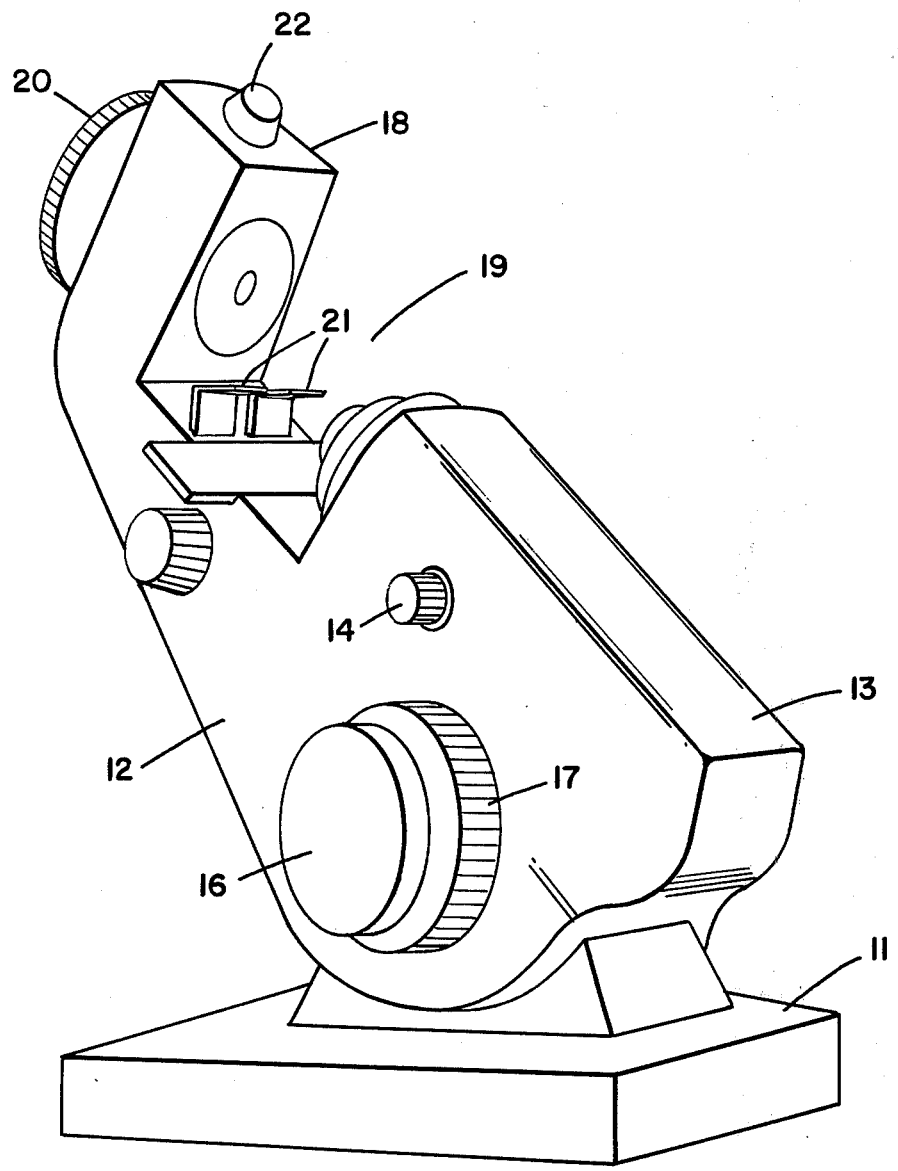
FIG_1

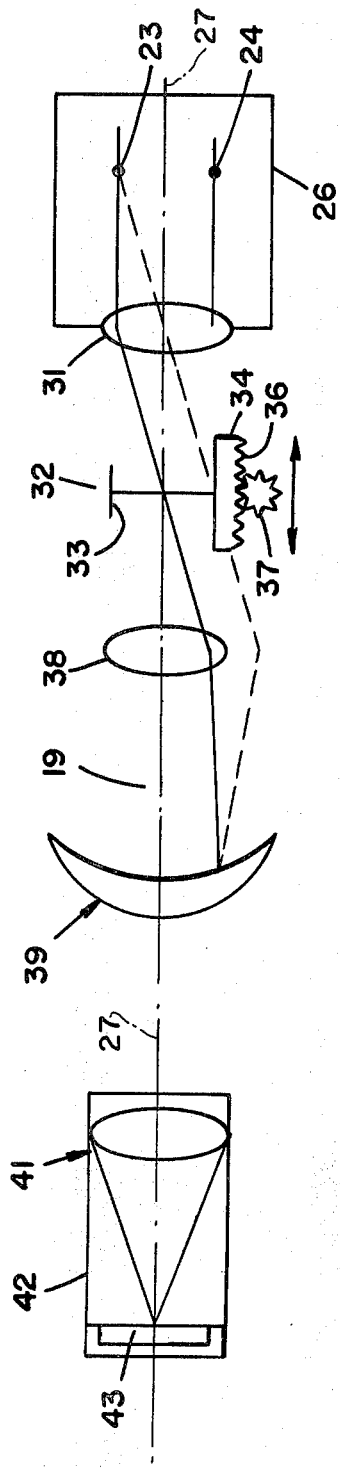
FIG_2
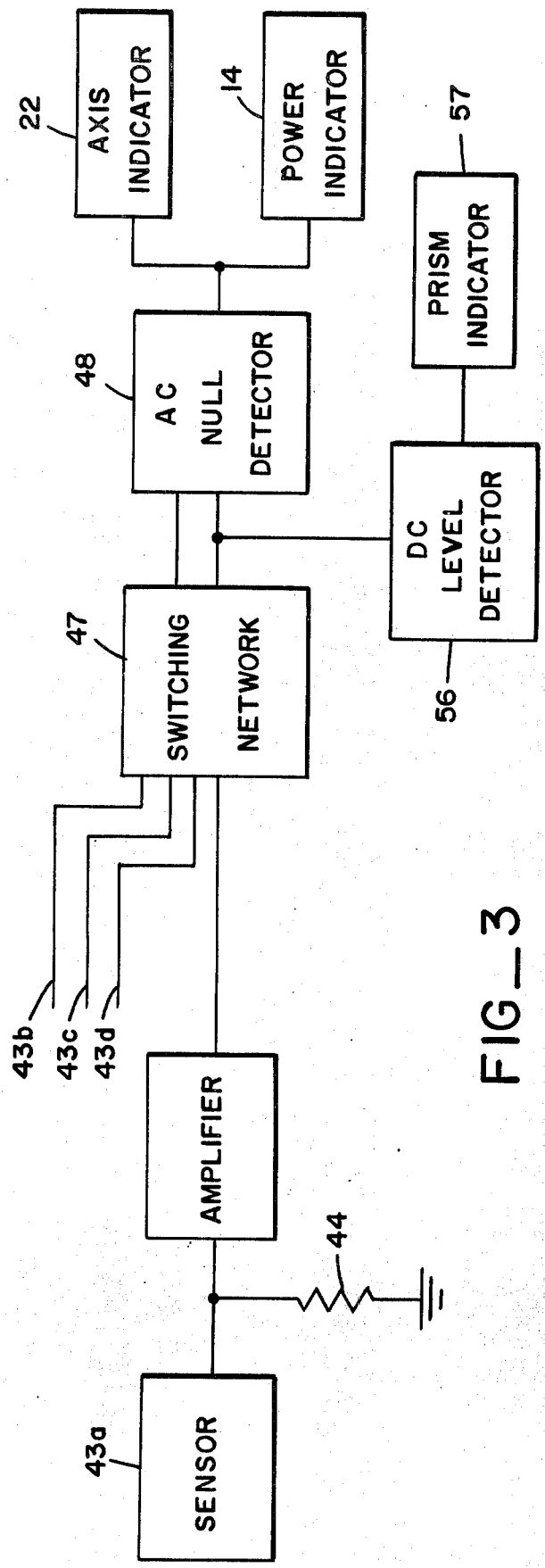
FIG_3

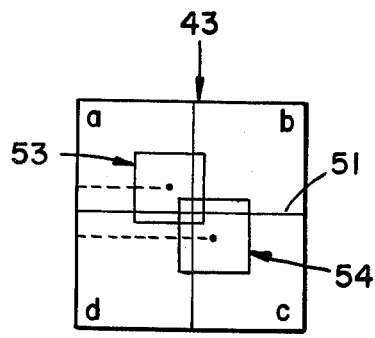
FIG_4a
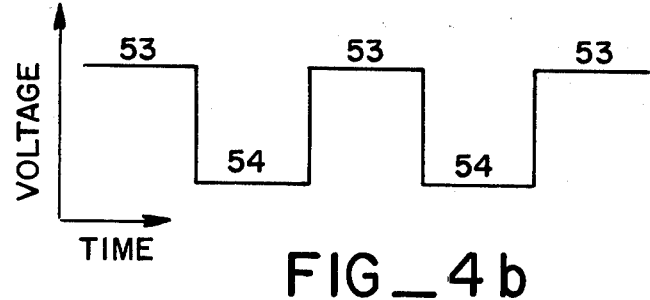
FIG_4b
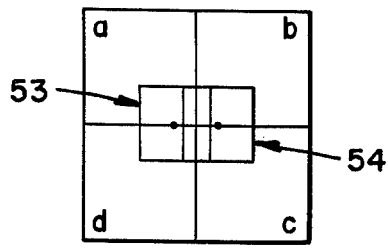
FIG_5a
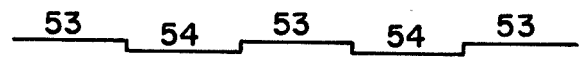
FIG_5b
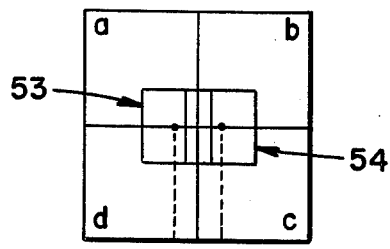
FIG_6a
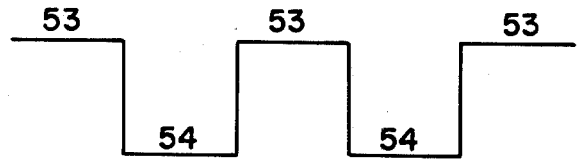
FIG_6b
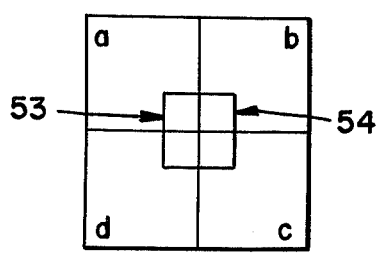
FIG_7a
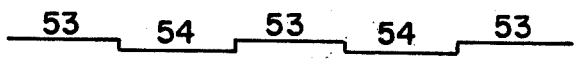
FIG_7b

AUTOMATIC OBJECTIVE LENSOMETER

BACKGROUND OF THE INVENTION

To analyze a general sphero-cylindrical ophthalmic lens for power, axis and prism, the prior art is replete with lensometers of various constructions and methods of operation. Generally speaking, a transparent reticular target is interposed between a light source and a collimating lens. The rays pass from the light source through the target and collimating lens and thence through the ophthalmic lens being analyzed. The rays then pass through a telescope which is provided with a prism reticle. The device is usually provided with a pair of manual wheels which translate and rotate the recticular target.

To employ the conventional lensometer the operator looks through the telescope and rotates both wheels slowly and simultaneously in either direction to bring into focus the principle axis line of the target reticle. When the line is judged by the operator to be in focus, the reading on the power wheel indicates spherical power (proportional to translation of the target), and the axis wheel reading indicates the axis of the cylinder. The operator then rotates only the power wheel to bring into focus the orthogonal axis line of the target reticle. This second reading indicates the power in the other principle meridian of the ophthalmic lens. The difference between the first and second power readings is the cylinder of the lens. Thus the ophthalmic lens is analyzed for power, axis and cylindrical correction.

In a professional practice the old and new glasses of each patient are examined for power, axis and prism for both lenses. It is estimated that an average of 20 pairs of glasses per day may be measured in a practitioner's office. In an optical shop where lenses are produced, the lenses are inspected for power, prism and axis during fabrication and again when the lenses are finished. In such a situation it is common to examine an average of 100 pair of glasses per day.

It may be appreciated that the concentration, effort and judgment required to operate the conventional lensometer may result in fatigue to the operator after repetitive, consecutive procedures. This fatigue can affect the judgment and care of the operator and result in substantial error. If several operators use the same lensometer, the telescope and reticle should be recalibrated for each individual to maintain accuracy. This is seldom done in practice, and results in errors in lens measurement.

To reduce the fatigue of monocular viewing in a telescope, projection lensometers have been developed recently. These lensometers permit binocular viewing of the target reticle on a screen. However, all the disadvantages of focusing for each lens are still present. The point of best focus still remains a judgment subject to the condition of visual acuity, concentration, and tedium of the operator.

There are other automatic lensometers; however, all others known are forced to mimic the conventional lensometer by simultaneously seeking both best focus and axis conditions. This requires a complex servo system to form the judgement that the eyes does in a conventional lensometer.

This new device allows axis and power to be automatically and objectively found independently of each other. Both axis and power require only one simple translation or rotation of the target and detector.

SUMMARY OF THE INVENTION

The present invention comprises an automated lensometer which accurately and reliably measures the power, prism and axis of an ophthalmic lens. It employs at least two light emitting diodes which are mounted on a mandrel, which is rotatable by means of a manual wheel or by a simple motor. The diodes are focused at the plane of the ophthalmic lens under investigation by lenses integral therewith to act as Scheiner apertures, with the rays therefrom directed toward a detector which is also rotatable. The rays pass through an aperture target which is translatable along the optical axis, and thence through a collimating lens. The ophthalmic lens under investigation is placed in the path of the rays which emerge from the collimating lens, and the rays enter a telescope objective.

The detector, which is disposed at the focal plane of the telescope objective, may comprise a conventional quadrant detector which produces an electrical signal from each Cartesian quadrant which is proportional to the illumination of the quadrant. The outputs from selected quadrants are added by a detector circuit. The light emitting diodes are driven by square waves which are out of phase, so that the added detector signals are out of phase and produce an alternating current signal upon a direct current component.

It should be noted that the LEDs are arrayed on lines which are parallel to the major axes of the quadrant detector. To find the axis of the ophthalmic lens, the mandrel and detector are rotated by the manual wheel or simple motor until a null is found by the detector circuit, indicating that the LED target images are falling on the major axis of the detector. To find the power of the lens, a second manual wheel is rotated (manually or by a simple motor), to translate the target and converge the images on the detector origin until a second null is found. The position of the target indicates power. A DC level indicator is provided to indicate the DC level of the quadrant detector, which is proportional to the prism of the ophthalmic lens. Thus the prism of the lens may be found.

It may be appreciated that the prism, power and axis of the lens under study is found without any judgment being required of the lensometer operator. The null conditions are indicated by lamps, lighted dials, or digital readouts, which are actuated at the precise null point. Thus, fatigue, carelessness, mis-calibration of the telescope, and judgment of correct focus are all eliminated as causes of error in finding lens characteristics. Furthermore, the present invention requires far less time to analyze the lens parameters than prior art devices.

THE DRAWING

FIG. 1 is a perspective view of the lensometer of the present invention.

FIG. 2 is a schematic view of the optical system of the present invention.

FIG. 3 is a block diagram of the electrical system of the present invention.

FIG. 4a and FIG. 4b depict a misalignment of the ophthalmic lens axis and the resulting detector output respectively.

FIG. 5a and FIG. 5b depict axis alignment and the resulting electrical null condition, respectively.

FIGS. 6a and 6b depict divergence of the target images during analysis for lens power, and the resulting detector output, respectively.

FIGS. 7a and 7b depict convergence of the target images when power is found, and the resulting detector null, respectively.

DESCRIPTION OF THE PREFERRED EMBODIMENT

With reference to FIG. 1, the lensometer of the present invention comprises a base 11, on which a housing 12 is mounted in angularly adjustable fashion, as is well known in the art. The housing includes a lower end 13 in which the light sources and optics are enclosed, and a power indicator light 14 mounted on the side wall of the lower end 13. A rotatable power wheel 16 is also secured to the lower end of the housing, and is provided with circumferential lens power gradiations 17. The upper end 18 of the housing is separated from the lower end by a channel 19 which is provided with clips 21 for securing the spectacles under examination. The upper end is provided with a rotatable axis wheel 20 extending therefrom, and an axis indicator light 22 extending from the top thereof. The upper end 18 also encloses the quadrant sensor of the invention.

With reference to FIG. 2, a pair of light emitting diodes 23 and 24 are provided, mounted in a cylinder 26 which is rotatable about its axis 27. The axis wheel is linked to the cylinder 26 through a pully system (not shown) to effect rotation of the cylinder for purposes to be explained. The light emitting diodes are spaced symmetrically with respect to the axis 27. The light from the LEDs is directed to an objective lens 31, also mounted on the cylinder 26. In the preferred embodiment, the LEDs comprise Ga As devices emitting 4mW of radiation at 9000 A with an input current of 100 ma.

Adjacent to the cylinder 26 is a target 32, which comprises an aperture plate 33 joined to a block 34 which is translatable along the axis 27. The aperture plate is disposed perpendicular to the axis and includes a circular or rectangular hole therein through which pass the rays from the LEDs. The block is provided with teeth 36 extending subjacently therefrom which are engaged by a drive gear 37. The drive gear 37 is linked to the power wheel 16 by any drive train means commonly known in the art, so that rotation of the power wheel turns the drive gear 37 and causes the target 32 to translate along the axis 27.

The rays from the LEDs pass through the target aperture and through a standard, or collimating lens 38 fixedly disposed adjacent thereto. From the collimating lens 38 the rays pass through the channel 19, through the ophthalmic lens 39 secured in the clips 21, and into a telescope objective 41 mounted in the upper end 18 of the housing 13. The telescope 41 is mounted in a rotatable cylinder 42 which is directly connected to the axis wheel 20, so that manual rotation of the axis wheel causes rotation of the cylinder 42 and simultaneous identical rotation of the cylinder 26 housing the LEDs.

Disposed at the focal plane of the telescope objective within the cylinder 42, is a light transducer 43 which produces an electrical signal proportional to the illumination by the images of the LEDs. It should be noted that the images are always in focus, due to the fact that the LEDs are in effect Scheiner point sources. The target images, which normally fall on the center of the transducer when no ophthalmic lens is present, will be caused to diverge from the center of the transducer by the sphero-cylindrical cylindrical confiugration of the lens. The transducer may comprise a conventional quadrant detector, in which the sensing surface is partitioned into Cartesian coordinates, each generating a signal indicating the amount of illumination received.

Alternatively, the transducer may comprise a position sensitive detector which indicates absolute position information of the images relative to the X and Y axes of the detector, such as that produced by United Detector Technology, Inc. These detectors automatically find the center of the image and indicate the coordinates of the center. The peak sensitivity is to light at 8500 A, which is very close to the wavelength of the LEDs. The response of either of these area detectors is such that for 1 milliwatt of incident light, a movement of the image 0.001 inch will result in a current imbalance of 1 $\mu$a. This amount, when fed through a $10^5$ $\Omega$ resistor, results in a signal voltage of 100 mV.

It should be noted that the light emitting diodes 23 and 24 are each powdered by square waves which are 180° out of phase. Thus only one LED is emitting at any time, and only one image is falling on the transducer. Therefore, each image will cause the transducer to produce a square wave output, and these outputs will be out of phase. When the images converge on the light transducer, the target aperture is disposed so that its image is at the focal point of the lens 39, and the position of the target is proportional to the power of the lens.

With reference to FIG. 3, the sensor 43a, which represents one quadrant of a quadrant detector, generates a current signal which is fed across a grounded resistor 44. The resistor 44 which is on the order of $10^5$ $\Omega$, converts the current signal to a voltage signal. The voltage signal is fed through an amplifier 46 to a switching network 47. Here the similarly processed other signal inputs from the quadrants 43b, 43c and 43d are added in various combinations, as will be explained in the following. The added signals are fed to an AC null detector 48, which automatically senses a null condition when it exists in the combined signals conducted to it. The null detector may use a threshold or phase sensitive detection circuit. The null detector 48 actuates the appropriate indicator 22 or 14 when null is achieved.

The major axis 51 of the quadrant detector, shown in FIG. 4, is aligned exactly with the line on which the LEDs 23 and 24 are mounted. Therefore, the respective target images 53 and 54 will normally fall on the major axis 51. However, the cylindrical correction of the ophthalmic lens will cause the images to be misaligned with respect to axis 51, as shown in FIG. 4a, unless the axis 51 is aligned parallel with the axis of the ophthalmic cylinder. To analyze this condition the switching network 47 is set to combine signals from quadrants a and b, and subtracts this from the sum of quadrants c and d, and the null detector finds a null point between images 53 and 54. Initially the null detector senses an anti-null as shown in FIG. 4b. The axis wheel 20 is then rotated in either direction to cause the images to fall on the axis 51 as the axis 51 is oriented parallel to the ophthalmic cylindrical axis. When this condition exists the images 53 and 54, which are 180° out of phase in time, are falling equally on the upper quadrants a and b, and the lower quadrants c and d, as shown in FIG. 5a. This condition produces a null (a+b − c+d) as shown in FIG. 5b, and the detector 48, sensing the null is equal for images 53 and 54, actuates the axis indicator 22. The operator, sensing the indicator flash on, can read the angle of the axis wheel and find the axis of the lens 39.

Once the axis is found, the power of the lens may be found by converging the images 53 and 54. This may be accomplished by translating the target aperture by means of the power wheel 16, as is well known in the art. The switching network is set so that the signals from quadrants a and d are summed and subtracted from the signals from the sum of quadrants b and c. The null detector 48 compares these sums in images 53 and 54 to find a null condition indicative of image convergence.

Initially the images are diverged as shown in FIG. 6a, with the resulting signal in the null detector shown in FIG. 6b. As the images 53 and 54 achieve maximum coincidence, shown in FIG. 7a, the images fall equally on the left and right quadrants, and the null shown in FIG. 7b is reached. At this point, the null detector actuates the power indicator 14. The operator, seeing the indicator 14 flash on, may then read the power wheel circumferential gradiations and find the power of the lens.

To find the prism of the ophthalmic lens, the DC level of the summed voltages must be found. Therefor a DC level detector 56 is provided, connected to the switching network 47. The detector 56 is responsive to the absolute value and the absolute DC level of the signals conducted to it, and responds to such a minimum by actuating the prism indicator 57. It may be appreciated that prism in the ophthalmic lens will cause each image 53 and 54 to disperse about the origin, causing the same (in phase) signal to be produced in adjacent or opposed quadrants. These signals, when added together, comprise a DC voltage level. Minimization of this DC level indicates the optical center of the ophthalmic lens, and the absolute level is directly proportional to the amount of prism from the optical center.

Thus the present invention provides a truly objective lensometer which requires no subjective evaluations on the part of the operator. The lensometer is not subject to errors generated by mis-calibration, visual acuity of the operator, and the subject determination of best focus by the operator. The procedures described in the foregoing can be done extremely rapidly and accurately with a minimum of training.

It should be noted that although the preferred embodiment is described as employing two light emitting diodes as point sources, the present invention encompasses the use of a greater number of point sources to aid in finding the properties of the lens. For example, four light emitting diodes placed in a plane and symmetrical about the optical axis would aid in producing a sharp null during the procedures for finding power and axis of the lens.

The positions of the power and axis wheels can be indicated as a lighted or digital number by standard means such as reticle and light or a linear transducer and digital readout. A permanent recording of power and axis can be accomplished by adding a digital printer, for example, onto the digital readout.

The power and axis wheels can be turned manually or by simple motors that are gated off at the correct power and axis positions by the threshold circuit.

I claim:

1. A device for analyzing the optical properties of a lens, comprising a plurality of Scheiner point light sources with electrically controlled light intensity, actuated periodically and out of phase each with the other, said point light sources arrayed about an optical axis and directed therealong; first rotating means supporting said point light sources and selectively rotatable about said optical axis; said Scheiner point light sources being stationary with respect to said first rotating means; means for retaining the lens under analysis in the path of the rays from said point light sources; target aperture means disposed between said point light sources and said retaining means and translatable along said optical axis; telescope means for focusing said rays passing through the lens; light transducer means disposed at the focal plane of said telescope means for generating an electrical signal in proportion to the illumination from the target images from said point light sources falling thereon; electrical circuit means for processing said electrical signal and determining the relative alignment and convergence of said images; second rotating means for supporting said light transducer means and rotating same about said optical axis in concert with said first rotating means.

2. The device of claim 1, wherein each of said point light sources comprises light emitting diodes.

3. The device of claim 1, wherein said light transducer means comprises a light sensor partitioned in quadrants, each quadrant producing an electrical signal proportional to the illumination falling thereon.

4. The device of claim 3, including alternating current null detector means for detecting a null condition between said signals from selected quadrants of said light sensor.

5. The device of claim 4, further including switch means connected between said light sensor and said alternating current null detector means for selecting and summing said signals from said selected quadrants and conducting said selected and summed signals to said alternating current null detector.

6. The device of claim 3, further including direct current voltage level sensing means for detecting a minimum and absolute DC voltage level of summed signals from selected quadrants of said light sensor.

7. The device of claim 1, further including collimating lens disposed between said lens under analysis and said target aperture means.

8. The device of claim 7, further including manual power wheel means for selectively translating said target aperture means and thereby altering the convergence of said target images from said point light sources on said light transducer means.

9. A method for determining the cylindrical axis of a lens independent of the condition of the lens, comprising the steps of illuminating the lens with a plurality of Scheiner point light sources having electrically controlled light intensity, actuating each of said light sources periodically and out of phase with the others, focusing the rays passing through said lens onto a light sensor having distinct sensing areas, comparing the signals from said plurality of light sensors to find an AC null condition indicative of proper alignment of said point light sources with said axis, rotating said point light sources and said light sensors equally and in parallel planes until said null condition is obtained, and determining the angular orientation of said light sensors.

10. A method for determining the power of a lens, comprising the steps of illuminating the lens with a plurality of Scheiner light sources having electrically controlled light intensity, providing a translatable target aperture between said point light sources and the lens, focusing the rays passing through said target aperture and the lens onto a light sensor having distinct sensing areas, each producing a current signal in proportion to the illumination thereon, maintaining said point light sources stationary with respect to said light sensor, actuating each of said point light sources periodically and out of phase with the others, comparing said current signals to detect an AC null condition indicative of convergence of the point light source images in the center of said light sensor, selectively translating said target aperture to converge said images and achieve said null condition, and converting the target aperture position to lens power units.

11. A method for determining the optical center and prism of a lens comprising the steps of illuminating the lens with a plurality of Scheiner point light sources having electrically controlled light intensity, focusing the rays passing through the lens onto a light sensor having distinct sensing areas, each producing a signal in proportion to the illumination thereon, actuating each of said point light sources periodically and out of phase with the others, maintaining said point light sources stationary with respect to said light sensor, converging said point light source images on the center of said light sensor, selectively combining said signals to find the DC absolute voltage level thereof, and converting said voltage level to corresponding distance from the optical center of the lens.

* * * * *